United States Patent [19]
Hoffman et al.

[11] 3,846,494
[45] Nov. 5, 1974

[54] DIALKYLAMIDE ADDUCTS OF LITHIUM CYANIDE

[75] Inventors: Doyt K. Hoffman; Ricardo O. Bach, both of Gastonia, N.C.

[73] Assignee: Gulf Resources & Chemical Corporation, Houston, Tex.

[22] Filed: Feb. 23, 1972

[21] Appl. No.: 228,781

Related U.S. Application Data

[62] Division of Ser. No. 73,646, Sept. 18, 1970, abandoned.

[52] U.S. Cl. ...... 260/561 R, 260/557 R, 260/558 R, 260/562 R, 23/79
[51] Int. Cl. ............................................ C07c 103/30
[58] Field of Search ................................ 260/561 R

[56] References Cited
UNITED STATES PATENTS
2,698,337   12/1954   Heider et al. ............... 260/561 R OTHER PUBLICATIONS
Haas, Chem. Abstracts, 60: 7532d.
Lassigne et al., Chem. Abstracts, 75: 144458b.

*Primary Examiner*—Lewis Gotts
*Assistant Examiner*—Ethel G. Love
*Attorney, Agent, or Firm*—Wallenstein, Spangenberg, Hattis & Strampel

[57] ABSTRACT

Adducts of lithium cyanide with certain amides such as dimethylformamide as stable materials for the production of lithium cyanide.

3 Claims, No Drawings

DIALKYLAMIDE ADDUCTS OF LITHIUM CYANIDE

This application is a division of application Ser. No. 73,646, filed Sept. 18, 1970, now abandoned.

LiCN has been described as an effective reagent for replacing halogen groups by the cyano group in various compounds which do not react with silver cyanide. (I. B. Johns and H. R. Dipietro, Monsanto Tech. Rev. 10, 1, 18-19 - 1965).

Numerous ways of producing LiCN are known but most of them have serious disadvantages. Thus, the preparation from Li metal and hydrocyanic acid in benzene is hazardous because of the pyrophoricity of Li metal and the extreme toxicity of HCN (A. Perrett and R. Perrot, Helv. Chim. Acta 15, 1165 (1932)). Another method involves the interaction of HCN with butyllithium in hexane solution. Both methods deal with expensive raw materials, a gas of great toxicity and a pyrophoric liquid. K. Rossmaurter (Monatsh. Chem. 96, 6,1690 (1965)) describes the preparation of a LiCN.tetrahydrofuran solvate from the reaction of Li metal in the presence of naphthalene with AgCN, but the economics of this method militate against its use on an industsrial scale. Still other methods are mentioned in Gmelin's Handbuch Der Anorganischen Chemie, 8th Edition Lithium System — Number 20, Verlag Chemie 1960, p. 501-502, but none of these methods yield pure or anhydrous LiCN.

In connection with our efforts to produce LiCN in a manner such as would avoid the objections and disadvantages of prior known procedures, we have reacted LiCl with NaCN in a solvent medium in which said reactants and LiCN had some solubility, and in which the NaCl byproduct formed is insoluble or very slightly soluble in said solvent medium so that a separation could be effected of the desired LiCN from the byproduct NaCl. The solvent medium which we utilized was dimethylformamide (DMF) in which it is known that the following salts have the following solubilities at 25°C:

| LiCl | 11.4 | g/100 g DMF |
| NaCl | 0.05 | g/100 g DMF |
| NaCN | 0.76 | g/100 g DMF |

(E. I du Pont de Nemours & Company Bulletin No. A-55617 767/6 M, p. 23). We have ascertained that the solubility of LiCN in DMF at 25°C is about 2.1 g/100 g DMF.

We found, however, that when equimolar mixtures of LiCl and NaCN were interacted in DMF, while some metathetical reaction was observed, the reaction, surprisingly, did not go to any substantial completion.

Our present invention is based upon certain procedures pursuant to which crystalline adducts of lithium cyanide with certain amides are obtained. In connection with carrying out such procedures, essentially complete reaction is achieved between LiCl and NaCN (or KCN) to produce LiCN in an effective and economic manner so as to take full advantage of cheap, readily accessible starting materials for the production of the LiCN amide adducts of the present invention. In accordance with our invention, LiCl (or LiBr or LiI), especially LiCl, is reacted with a substantially equimolar proportion of NaCN (or KCN) at an elevated temperature, generally within the range of about 200° to about 700°C, preferably about 500° to about 600°C. The LiCN which is formed is then extracted from the reaction mixture with an organic solvent in which the LiCN is preferentially soluble to that of the byproduct NaCl, KCl (or sodium or potassium bromide or iodide, as the case may be). The organic solvents which are especially advantageous for this purpose can be represented by the formula

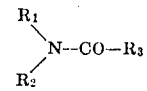

where $R_1$ and $R_2$ are the same or dissimilar lower alkyl such as methyl, ethyl, propyl, isopropyl, butyl and isobutyl; cycloalkyl such as cyclopentyl and cyclohexyl; aryl such as phenyl, ethylphenyl, isopropylphenyl and benzyl; and $R_3$ is hydrogen, and lower alkyl, cycloalkyl and aryl as illustrated above. Particularly preferred organic solvents of this type are DMF ($R_1$ and $R_2$ are each $CH_3$ and $R_3$ is hydrogen), DMA ($R_1$, $R_2$ and $R_3$ are each $CH_3$), and N-Methyl-2-pyrrolidone

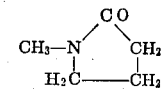

As we have pointed out above, we have found, in accordance with our invention, that LiCN forms solid crystalline essentially 1:1 molar adducts with organic solvents such as DMF and DMA (and other solvents of the above general formula) which possess increased stability over anhydrous LiCN. Anhydrous LiCN can be obtained from such adducts by vacuum drying at elevated temperatures, generally in the range between about 100° and about 200°C.

The following examples are illustrative of the practice of our invention, but they are not to be construed as in any way limitative thereof since various changes can readily be made in the light of the guiding principles and teachings disclosed herein. All temperatures recited are in degrees Centigrade.

EXAMPLE 1

Half-molar quantities of anhydrous LiCl and NaCN were heated at 560° for 15 minutes, whereupon melting occurred. After cooling and grinding, the solids were leached with 500 ml of DMF at reflux for 1 hour. The resulting solution was 0.75 N in LiCN, containing 12.3 g for a yield of 74.5 percent. Upon standing and cooling, a crystalline precipitate formed and was filtered off. This was shown to be an adduct corresponding to the formula LiCN.DMF.

EXAMPLE 2

The filtrate obtained in Example 1 was flash evaporated and heated at 100° for 1 hour. Analysis of the solid crystalline residue showed it to correspond to the formula LiCN.DMF. A thermogravimetric analysis of this material was performed. Decomposition began about 100° and became rapid at 150°. The weight became constant through 600° at a loss of 65 percent (theoretical 69 percent). A sample of LICN.DMF, 7.50 g, was evacuated for 3 hours at 150°, 4.56 g of DMF were removed, corresponding to 60.8 percent of the original sample. Upon raising the temperature to 165°, an additional 0.20 g were removed in 2 hours for a total weight loss of 63.5 percent, the theoretical DMF content was 5.17 g, 69 percent.

EXAMPLE 3

Half-molar quantities of anhydrous LiCl and NaCN were heated at 560° for 15 minutes. The resulting fused solids were ground and extracted with DMA by means of a Soxhlet extracter. After cooling, the DMA slurry was filtered and the solids washed with hexane and dried at room temperature. Analysis of the crystalline solids corresponded to the 1:1 adduct of LiCN and DMA.

We claim:

1. An adduct in crystalline form corresponding to the formula

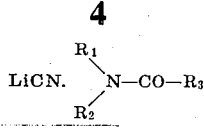

where $R_1$ and $R_2$ are the same or dissimilar lower alkyl, and $R_3$ is selected from the group consisting of hydrogen and lower alkyl.

2. An adduct according to claim 1 where $R_1$ and $R_2$ are each methyl and $R_3$ is hydrogen.

3. An adduct according to claim 1 where each of $R_1$, $R_2$ and $R_3$ is methyl.

* * * * *